United States Patent Office 3,495,438
Patented Feb. 17, 1970

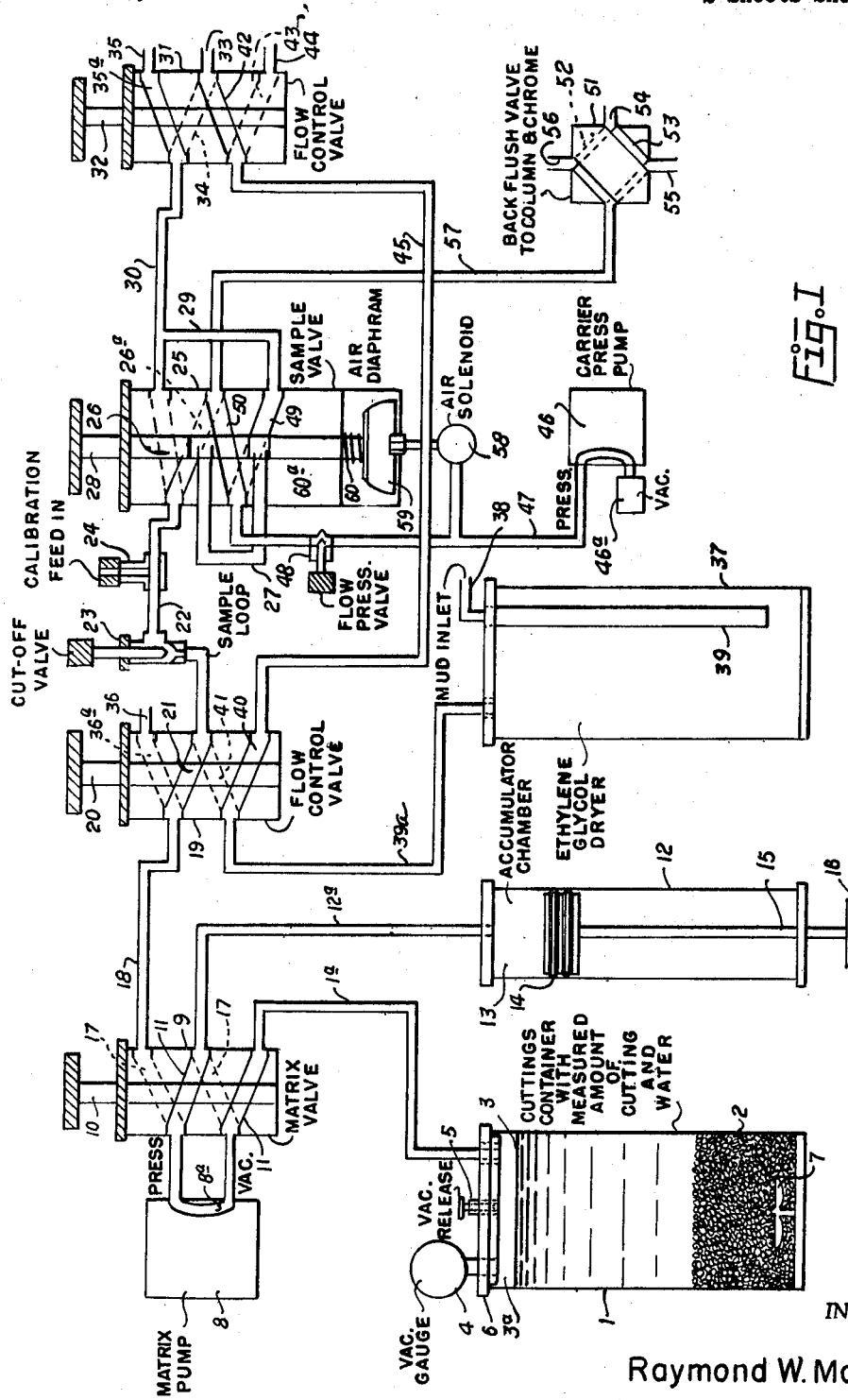

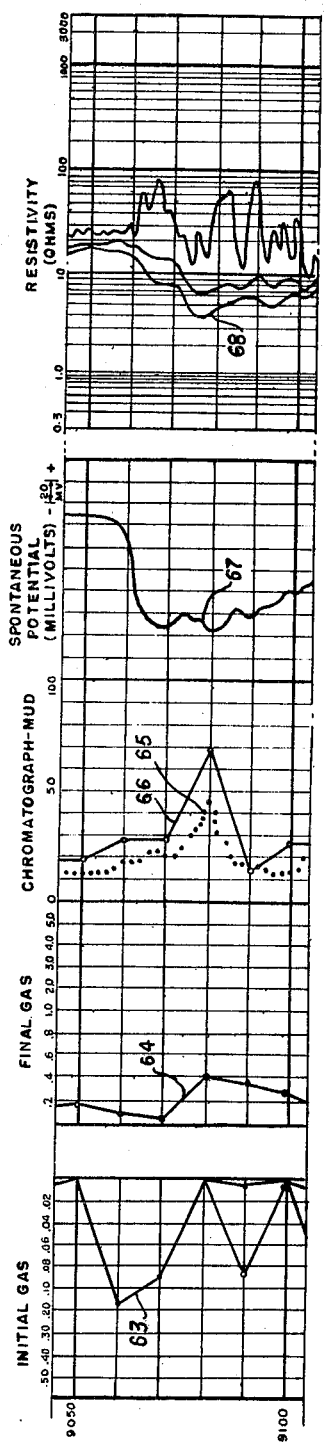
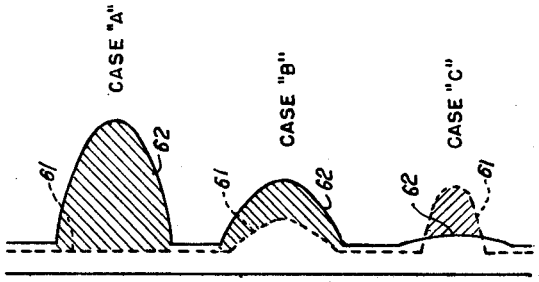

3,495,438
METHOD AND APPARATUS FOR DETERMINING PRODUCTIVE CHARACTERISTICS OF WELL FORMATION
Raymond W. Mangum, Midland, Tex., assignor to Hammit & Mangum Service Company, Inc., Midland, Tex., a corporation of Texas
Filed June 9, 1967, Ser. No. 644,919
Int. Cl. G01n 7/14
U.S. Cl. 73—19                                6 Claims

ABSTRACT OF THE DISCLOSURE

A device and process for determining the porosity, permeability, and saturation of subsurface formations while drilling an oil well, wherein measured volumes of washed and screened cuttings are placed in a container. The container is filled with water, leaving a space at the top for an air cavity. A vacuum is placed on the container, drawing a vacuum on the contents therein. Gas is drawn from the sample and transferred to an accumulator chamber. After loading the accumulator chamber the collected gas is transferred into a gas chromatograph where it is analyzed to determine the amount and hydrocarbon content thereof. This initial gas withdrawal is plotted on a log form. The vacuum is then released from the container and the sample of cuttings are pulverized by a blade therein to virtually powdered form. A vacuum is again drawn on the container and the gas is drawn therefrom into the accumulator from whence it is transferred to the gas chromatograph for analysis to determine the volume and composition thereof. This information is also plotted on a log form so that the gas given up by the cutting in its initial state and that given up when pulverized can be compared to thereby determine the porosity and permeability of the formation in its initial state. It may thus be determined that although hydrocarbons are present in productive quantities in the formation, the porosity and permeability thereof may be so tight as to prevent normal production.

The above indicated procedure is successively carried out as the well is drilled to continuously test the formations as they are encountered.

Circulating mud is also continuously tested by subjecting samples of gas taken therefrom to the chromatograph analysis, and such is plotted on a log form to compare the hydrocarbons picked up by the mud with those attained by the cutting analysis indicated above.

The above process is carried out by appropriate valve controls which will be described in detail hereinafter.

DESCRIPTION OF THE INVENTION

The present invention involves the study of formation properties derived through gas analysis.

There are four principal properties of formations looked for when drilling for oil or gas, to-wit; the presence of hydrocarbon products, the porosity of the formation, the permeability of the formation and the saturation thereof.

By use of the process hereinafter described a relative measure of hydrocarbons retained within the matrix of the formation samples is measured and saturation, porosity and permeability are determined. The ability of the formation to give up and produce hydrocarbons is primarily determined by the porosity and permeability thereof. In other words, if the formation is too tight even though it may be saturated with hydrocarbons, the hydrocarbons cannot be produced in paying quantities.

The porosity of the formation must be permeable enough to give up its saturation.

Ordinary electric logging techniques have heretofore been able to determine the presence and saturation of the formations drilled through, but such methods have been unable to determine whether the formation is permeable enough to produce the hydrocarbons by normal producing techniques.

By use of the method herein disclosed an indirect method of analysis is applied to formation cuttings to achieve the relative measure of porosity, permeability and saturation, and such is plotted in a manner to give visual indication thereof.

The presence and relative amount of hydrocarbons picked up by circulation mud may also be determined for comparative purposes during the drilling process.

Other and further objects of the invention will become apparent upon reading the detailed specification hereinafter following and by referring to the drawings annexed hereto.

DESCRIPTION OF THE DRAWINGS

Suitable apparatus in diagrammatic form is shown in the attached drawing for carrying out the method hereinafter described.

In the drawings,

FIGURE I is a diagrammatic view of the apparatus employed for carrying out the process hereinafter described and claimed, FIGURE II is plotted indications of the contents of the same formation determined by the process employed herein as compared with an electric log, and showing the comparison between initial gas and final gas drawn from the same cuttings before and after pulverizing same, and FIGURE III is a diagrammatic view comparing gas drawn from original and pulverized matrixes in three different examples.

DESCRIPTION OF A PREFERRED EMBODIMENT

Numeral references are employed to indicate the various parts and elements shown in the drawings and like numerals indicate like parts and elements throughout the various figures of the drawings.

The numeral 1 indicates a cuttings container having a removable air tight cover 6 thereon. A quantity of formation cuttings 2, in the state in which they come from the well are placed in the container 1. The container 1 is then partially filled with water 3 leaving an air cavity 3a at the top thereof. A vacuum indicator gauge 4 communicates with the container, and a vacuum release valve is positioned in the top of the lid 6 to release the vacuum from the container when desired.

A gas transfer conduit 1a communicates through the lid 6 with the interior of the container 1 and with the valve 9.

A pulverizing blade 7, which may be rotated by a suitable motor (not shown) is positioned in the bottom of the container for the purposes hereinafter mentioned.

A vacuum pump 8 is arranged to draw a vacuum on the interior of the container 1 and withdraw gas from the interior of the container through the conduit 1a, through passages 11, and the loop 8a passing through said pump.

The multiple position valve 9 has passages 11 therethrough which cause communication through loop 8a between the conduit 1a and the outlet line 12a. The line 12a communicates with the chamber 13 above the piston 14 in the accumulator cylinder 12.

Thus, it will be seen that when the valve 9 is manipulated by the control 10 to cause communication through the passages 11 and loop 8a between the lines 1a and 12a, gas collected in the space 3a, above the water 3 in the container 1 is drawn by the vacuum pump 8 into the accumulator chamber 13. The gas given off by the cuttings 2 collects in the space 3a and is transferred to the accumulator chamber 13.

After the initial gas has been collected and accumulated in chamber 13 the valve control 10 is manipulated by pushing same inwardly to cause communication through passages 17 in valve 9 and closing the passages 11, thereby establishing communication between lines 12a and 18. Then by pushing inwardly on the handle 16 the piston 14 may be moved inwardly of cylinder 12 control rod 15 to force the gas accumulated in chamber 13 through line 12a, passages 17, loop 8a, line 18 and passage 21 in multi-position valve 19. With cutoff valve 23 in open position the test gas passes through line 22, open valve 24, passage 26 in multi-position valve 25, line 30, passage 34, multi-position valve 31, outlet passage 33 which is attached to a conventional chromatograph (not shown) where it is analyzed. The valve 25 has a control 28 whereby the multiple passages therein may be connected or closed as may be desired in the manner hereinafter described.

The valve 31 likewise has a control 32 which may be manipulated to place the various passages therethrough in open or closed position, or in communication, as may be desired.

An exhaust port 35 is provided in the valve 31 which may be brought into communication with the passage 35a therethrough as passage 34 is closed to thereby exhaust gas from the system, and bypass the chromatograph, if desired. Likewise, the valve 19 has an exhaust port 36 therein which is in communication with a passage 36a whereby gas may be exhausted from the system through said passage by manipulation of the valve if desired.

After the initial gas is passed through the system as herein described, analyzed to determine the volume and content thereof for plotting, the cutting sample 2 is pulverized by rotating the blade 7 therein. This permits additional gas to be given up the cutting sample which accumulates in the space 3a, passed to the accumulator chamber 13 and is forced through the system to the chromatograph for analysis in the manner hereinbefore described. The final gas is thus withdrawn from the pulverized cuttings 2 may be plotted on a log for comparison with the initial gas given up by the cuttings in their original form.

Mud samples may be tested with the apparatus disclosed to determine the relative gas content thereof as drilling progresses.

For this purpose there is provided an ethylene glycol dryer 37 within a container to which are admitted mud samples through the inlet 38 to the dispersal tube 39 extending downwardly into the container 37. Gas is extracted from the mud by the ethylene glycol dryer and passes outwardly out of the container to the line 39a. The valve control 20 is manipulated so as to close the test passage 21 therethrough and open the passage 40. The gas extracted from the mud sample passes through the passage 40, line 45, passage 42 through the valve 31 to the outlet 33 to the chromatograph where the gas is analyzed. The control 32 of valve 31 has been manipulated to close passage 34 and open passage 42.

Should it be desired to expel the gas extracted from the mud from the system the control 32 may be manipulated to close the passage 42 and open the passage 43 to the expelling passage 44. The gas sample extracted from the mud is analyzed in the chromatograph, and plotted on a log form for comparison with the initial gas and final gas extracted from the sample 2 in the manner hereinbefore described.

The system may be flushed out and purged by means of a flushing pump 46 which draws a vacuum on the system by the vacuum pump 46a. The pump 46 is connected through line 47 and valve 48 to passages 50 and 49 through valve 25. By opening the valve 48 and opening the other valves in the system the contents of the system may be withdrawn and evacuated by the pump 46.

The multi-position flushing valve 51 provides communication through the passages 52 and 53 to complete the flushing system through the connections 54, 55, and 56.

The flushing line 57 connects the back flush valve 51 with flushing passages 26a and 50 through valve 25.

An air solenoid 58 is automatically actuated by pump 46 to push the diaphragm 59 upwardly to automatically open the flushing passages through valve 25 when valve 48 is open and the pump 46 is actuated.

A spring 60 is interposed between the diaphragm 59 and partition 60a in the valve body 25 to urge the valve back to normal position when the flushing pump 46 is stopped.

Referring to FIGURE III a comparison is shown between initial and final gas extracted in three different cases.

The numeral 61 indicates gas drawn from pulverized formation samples and the numeral 62 indicates in full line the gas extracted from the cuttings in their initial state before being pulverized.

It will be seen that in Case "A" all of the gas is extracted from the original matrix and none is extracted after it is pulverized. Thus, this indicates that the formation is both porous and permeable and that it will give up virtually all of the hydrocarbons therein under normal pressure conditions.

In Case "B" a larger portion of the gas in the cuttings is extracted in the initial form and a smaller portion is extracted from the pulverized cuttings. This indicates that the formation would produce under normal conditions but not as good as may be desired.

In Case "C" it will be seen that very little of the gas in the formation is extracted in the original state of the cuttings, and that virtually all of same is extracted after pulverization. This would indicate that the formation is so impermeable and tight that it would probably not be productive under normal conditions, even through a considerable quantity of hydrocarbons is suspended therein.

In FIGURE II there are shown plotted logs of the same formations employing the process disclosed herein and the conventional electric log process.

In will be seen that the initial gas extracted from the formation sample, as indicated at 63, is considerably greater than the final gas 64, extracted after pulverization of the formation samples. Thus, it will be seen that the formations encountered are relatively permeable and would probably produce.

On the mud log the gas normally given off by the mud is indicated in broken lines 65 and that indicated on the chromatograph is indicated at 66. By comparison it will be seen that mud extracted from the same area as the cuttings examined by the method herein described indicates the presence of considerable quantity of hydrocarbon gas.

However, the conventional electric logs represented by the spontaneous potential and resistivity lines indicate the presence of water at 67 and 68 but do not indicate the presence of hydrocarbons in considerable quantity inasmuch as gas is not detected thereby.

It, therefore, will be seen that the process of plotting disclosed therein, is considerably more reliable than that indicated by the electric logging process.

Thus, it will be seen by the employment of the process hereinbefore described, it may be accurately determined whether or not hydrocarbons are present in a given formation, the quantity thereof, and whether or not the formation is permeable enough to give up its saturation. Without this information the completion of a well is a hit and miss proposition. This method renders so-called drill stem tests unnecessary.

It will be understood that other and further apparatus may be devised for practicing the method disclosed herein, the apparatus disclosed being a form which is suitable for the practice thereof.

Having described my invention I claim:

1. A method of determining the permeability, saturation, and hydrocarbon content of formation cuttings taken from a well comprising, placing the cuttings in a container in their state in which they are when taken from the well; drawing a vacuum on the container to extract gas from said cuttings; measuring the amount of said gas; releasing the vacuum on the container; pulverizing the cuttings; drawing a vacuum on the container to extract gas from the pulverized cuttings; measuring the amount of the gas extracted from the pulverized cuttings; and plotting the amount of gas initially extracted and finally extracted to compare same.

2. The process called for in claim 1 wherein the container is partially filled with water leaving an air space in the upper portion thereof.

3. The method called for in claim 1 with the addition of the step of extracting gas from a mud sample taken from the zone in the well where the cuttings are removed, extracting the gas from the mud sample and determining the amount and contents of the gas so extracted from the mud sample.

4. A method of logging a well while it is being drilled to plot the permeability, saturation and hydrocarbon content of formations through which the well is drilled comprising, taking samples of cuttings as they come from the well; progressively placing the samples in a container in the state in which they are when taken from the well; drawing a vacuum on the container to extract gas from the cuttings; measuring the amount of said gas; releasing the vacuum on the container; pulverizing the cuttings; drawing a vacuum on the container to withdraw gas from the pulverized cuttings; measuring the amount of the gas; and progressively plotting the amount of gas initially and finally extracted from each sample for comparison of same.

5. The method called for in claim 4 with the added step of progressively extracting gas from samples of mud as it comes out of the well; measuring the amount and contents of the mud for each formation tested; and plotting the amount of gas extracted from the mud.

6. A method of determining the permeability, saturation and hydrocarbon content of a formation in a well comprising, taking a sample of cuttings from the formation; extracting the gas from the cuttings in the state in which they are when taken from the well; measuring the gas to determine the amount thereof; pulverizing the cuttings; extracting the gas from the pulverized cuttings; measuring the gas taken from the pulverized cuttings to determine the amount thereof; and plotting the amount of gas initially and finally extracted to compare same.

References Cited

UNITED STATES PATENTS

| | | | |
|---|---|---|---|
| 2,749,748 | 6/1956 | Slobod | 73—153 |
| 2,883,856 | 4/1959 | Youngman | 73—23 |
| 2,531,083 | 11/1950 | Smith | 73—19 |
| 2,711,644 | 6/1955 | Myers | 73—19 |

FOREIGN PATENTS

| | | |
|---|---|---|
| 1,406,004 | 12/1966 | France. |
| 1,241,155 | 5/1967 | Germany. |

RICHARD C. QUEISSER, Primary Examiner

C. E. SNEE III, Assistant Examiner

U.S. Cl. X.R.

73—153